(12) United States Patent
Watanabe

(10) Patent No.: US 9,967,464 B2
(45) Date of Patent: May 8, 2018

(54) IMAGE REPRODUCING APPARATUS, IMAGE REPRODUCING METHOD, AND STORAGE MEDIUM

(71) Applicant: CANON KABUSHIKI KAISHA, Tokyo (JP)

(72) Inventor: Takeshi Watanabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/062,798

(22) Filed: Mar. 7, 2016

(65) Prior Publication Data
US 2016/0269640 A1    Sep. 15, 2016

(30) Foreign Application Priority Data
Mar. 9, 2015 (JP) .................................. 2015-046425

(51) Int. Cl.
*H04N 5/232*    (2006.01)

(52) U.S. Cl.
CPC ..... *H04N 5/23267* (2013.01); *H04N 5/23245* (2013.01); *H04N 5/23258* (2013.01); *H04N 5/23287* (2013.01)

(58) Field of Classification Search
CPC ........... H04N 5/23267; H04N 5/23258; H04N 5/23245; H04N 5/23287
See application file for complete search history.

(56) References Cited

U.S. PATENT DOCUMENTS

| | | | | |
|---|---|---|---|---|
| 2007/0046785 A1* | 3/2007 | Matsumoto | ............ | H04N 5/232 348/222.1 |
| 2009/0237519 A1* | 9/2009 | Fujii | .................... | H04N 19/154 348/220.1 |
| 2010/0214422 A1* | 8/2010 | Iwamura | ................ | H04N 5/232 348/208.4 |
| 2010/0225772 A1* | 9/2010 | Murayama | ......... | H04N 5/23248 348/208.4 |
| 2011/0193984 A1* | 8/2011 | Kitaya | ...................... | G06T 1/00 348/222.1 |
| 2013/0002924 A1* | 1/2013 | Nakajima | .............. | G03B 17/02 348/333.02 |

FOREIGN PATENT DOCUMENTS

JP    6-233316 A    8/1994

* cited by examiner

*Primary Examiner* — Abdelaaziz Tissire
(74) *Attorney, Agent, or Firm* — Canon U.S.A., Inc. IP Division

(57) ABSTRACT

There is provided an imaging apparatus capable of easily generating favorable still image data based on a moving image. The imaging apparatus is capable of capturing and recording a moving image, and capable of generating a still image based on the recorded moving image. During moving image capturing, the imaging apparatus corrects an image shake in an exposure period and records interframe shake information as metadata. When generating moving image data as a moving image, the imaging apparatus adds thereto a motion blur according to the shake information recorded as metadata. When generating moving image data as a still image, the imaging apparatus generates a still image without adding a motion blur thereto.

16 Claims, 9 Drawing Sheets

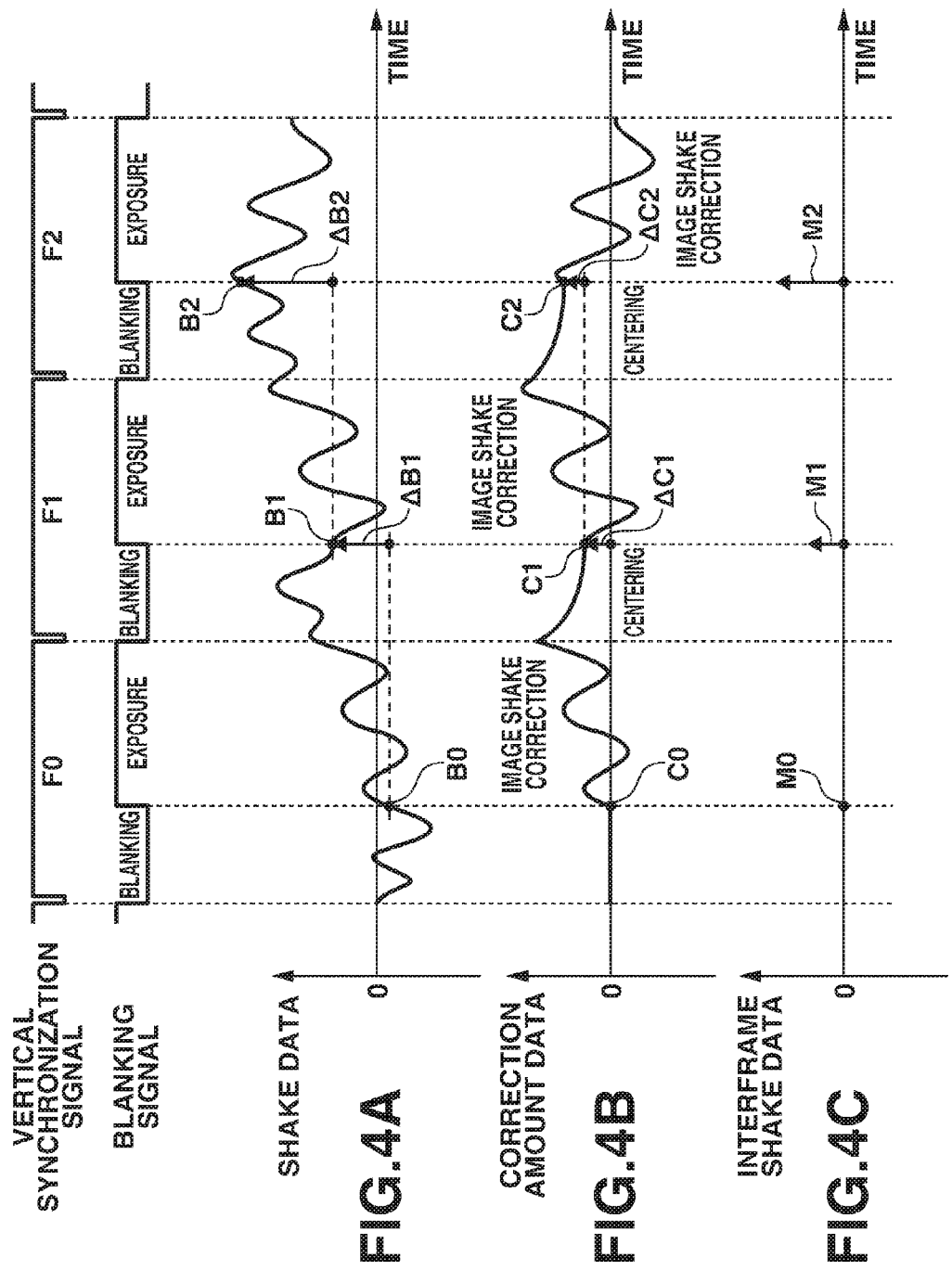

IMAGE REPRODUCING APPARATUS, IMAGE REPRODUCING METHOD, AND STORAGE MEDIUM

BACKGROUND OF THE INVENTION

Field of the Invention

The present disclosure generally relates to imaging and, more particularly, to an image reproducing apparatus, an image reproducing method, and a storage medium for generating a still image from a captured moving image, and is directed to obtaining still image data having favorable imaging conditions.

Description of the Related Art

Recent years have seen a rapid increase in the number of pixels provided by imaging apparatuses capable of capturing moving images. Imaging apparatuses capable of capturing moving images of the Full High Definition (FullHD) size have already been widely used, and imaging apparatuses capable of capturing 4K and 2K moving images are appearing in the market.

With such moving image definition enhancement, an image in each frame of a moving image is provided with sufficient number of pixels for use as a still image. Accordingly, it is expected that applications for generating a still image from each frame of a moving image will become further widespread in the future (Japanese Patent Application Laid-Open No. 6-233316).

A problem that arises when a still image is generated from a moving image lies in different methods for controlling image shake correction. In case of a still image, an imaging apparatus performs control to correct an image shake arising in the exposure period of a subject image.

More specifically, when a still image is generated from a moving image, it is desirable that no image shake arises in any frame constituting the moving image. However, when images captured in this way are reproduced as a moving image, the motion of a moving object included in the moving image is discontinuously displayed and visual image degradation with which a ghost is perceived by an observer who observes the moving image is thereby caused.

Therefore, in case of a moving image, it is desirable to leave an image lag (motion blur) in the exposure period so that the motion of a moving object in the moving image looks natural.

It has not been considered a technique for favorably generating a moving image and a still image when a moving image including a moving object is captured.

SUMMARY OF THE INVENTION

The present disclosure is directed to an imaging apparatus capable of generating a favorable image without an image shake when a still image is generated from a moving image, and capable of generating an image without strangeness even when captured images are reproduced as a moving image.

According to an aspect of the present disclosure, an image reproducing apparatus includes a reproduction unit configured to reproduce, as a moving image, moving image data which is a moving image in which an image shake is corrected by a first image shake correction unit based on an output of a shake detection unit, and to reproduce a predetermined frame image of the moving image data as a still image, and a motion blur addition unit configured to add to the frame image a motion blur produced by an interframe motion, wherein, when reproducing the moving image data as the moving image, the reproduction unit reproduces the moving image with a motion blur based on first shake information arising between frame images of the moving image data added, and wherein, when reproducing the moving image data as the still image, the reproduction unit reproduces the still image without a motion blur based on the first shake information added.

Further features of the present disclosure will become apparent from the following description of exemplary embodiments with reference to the attached drawings.

BRIEF DESCRIPTION OF THE DRAWINGS

FIGS. 4A, 4B, and 4C are graphs illustrating an example of a method for controlling the image shake correction control unit.

DESCRIPTION OF THE EMBODIMENTS

Figure 1:
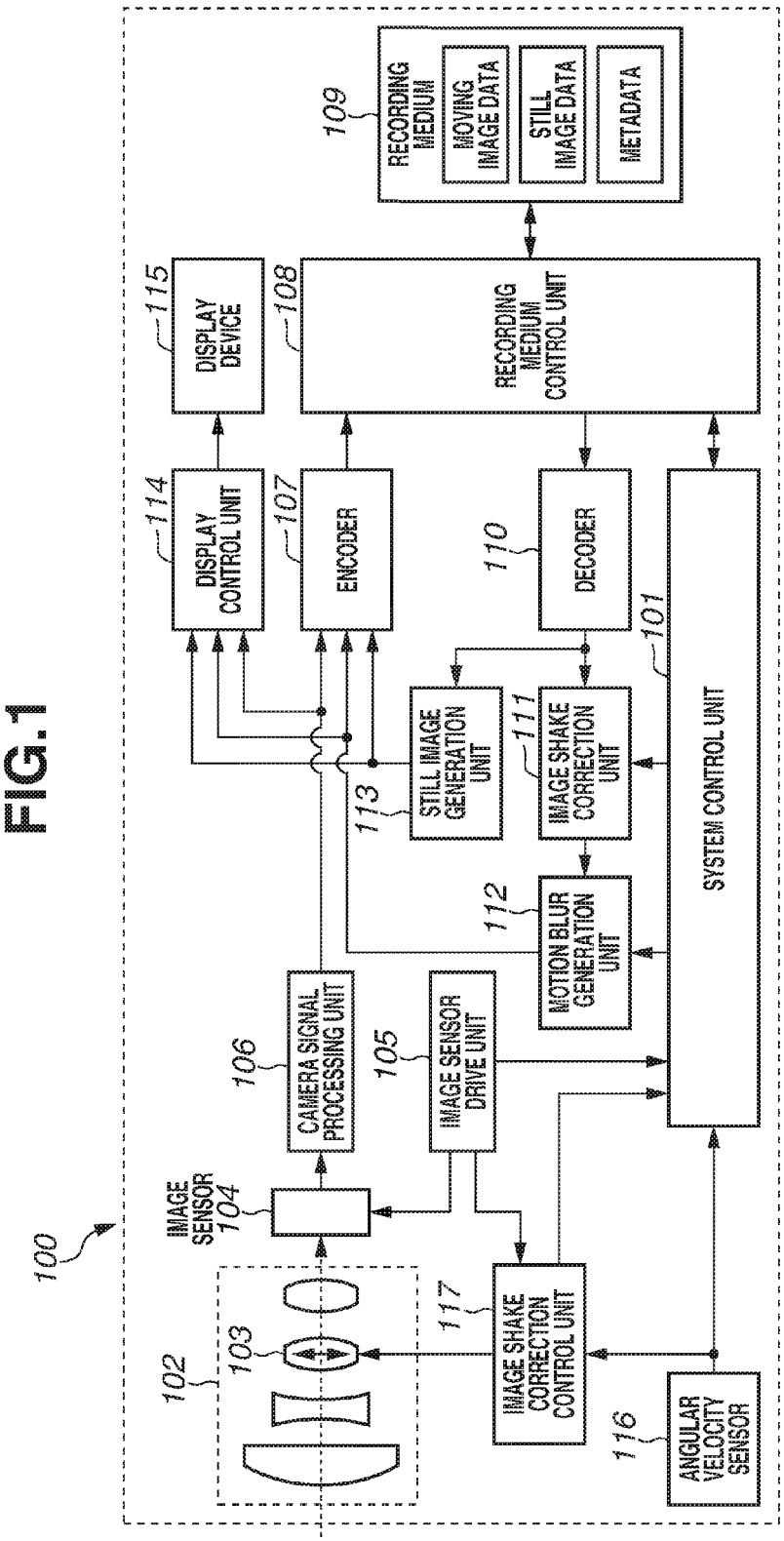
FIG. 1 is a block diagram illustrating an example of a configuration of an imaging apparatus according to a first exemplary embodiment of the present disclosure.

An overall configuration of an imaging apparatus according to a first exemplary embodiment of the present disclosure will be described below. FIG. 1 is a block diagram schematically illustrating an example of a configuration of an imaging apparatus 100 according to the present exemplary embodiment of the present disclosure.

Referring to FIG. 1, a system control unit 101 is a unit for controlling operations of the entire imaging apparatus 100. The system control unit 101 includes, for example, a central processing unit (CPU), which may include one or more processors, a random access memory (RAM), and a read only memory (ROM), and controls the imaging apparatus 100 by using the RAM as a work area according to a program prestored in the ROM. As used herein, the term "unit" generally refers to any combination of software, firmware, hardware, or other component, such as circuitry, that is used to effectuate a purpose.

Each piece of processing (described below) is implemented as a computer program (software) mainly by the system control unit 101.

As an imaging lens 102, a conventional general imaging lens having such functions as the zoom, focus, iris diaphragm, and image shake correction functions is applicable. A shift lens 103 serving as a first image shake correction unit is a lens movable in a direction perpendicular to the optical axis, and is capable of moving the position of the subject image focused on the image plane.

An image shake of a captured image can be corrected by moving the shift lens 103 so that a shake applied to the imaging apparatus 100 is canceled.

An image sensor 104 is composed of, for example, a complementary metal oxide semiconductor (CMOS) image sensor of the XY addressing type.

The image sensor 104 performs photoelectric conversion on an optical image formed by the imaging lens 102 to accumulate electric charges, and reads the electric charges to supply an image signal composed of a plurality of pixels to a camera signal processing unit 106.

The image sensor 104 is driven by an image sensor drive unit 105. For example, in case of a video signal conforming to the National Television System Committee (NTSC) format, the image sensor 104 operates to capture a subject image at 60-Hz intervals.

The image sensor 104 is provided with an electronic shutter function for sweeping electric charges accumulated by a control signal from the image sensor drive unit 105 to control the exposure time (accumulation time). The image sensor drive unit 105 supplies a blanking signal for indicating whether the image sensor 104 is in the exposure period or in the blanking period to an image shake correction control unit 117.

The camera signal processing unit 106 performs signal processing such as white balance adjustment and gamma correction on the image signal output from the image sensor 104 to convert the image signal into a video signal, and outputs the video signal to an encoder 107 and a display control unit 114.

The encoder 107 converts the video signal output from the camera signal processing unit 106 into moving image data in a predetermined format. It is also possible to convert frame images constituting a moving image into still image data in a format such as Joint Photographic Experts Group (JPEG).

A recording medium control unit 108 controls a recording medium 109 to record and read moving image data, still image data, or metadata. The recording media 109 is an information recording media such as a semiconductor memory, or a magnetic recording medium such as a hard disk.

A decoder 110 decodes moving image data and still image data in various formats recorded on the recording medium 109 to generate a video signal.

An image shake correction unit 111 serving as a second image shake correction unit corrects an image shake included in a moving image. More specifically, the image shake correction unit 111 clips a predetermined range from an original image, and controls the image clipping position on a frame basis to electronically correct an interframe image shake.

A motion blur generation unit 112 generates images having different resolutions based on an original image, and combines them with the original image while shifting the image positions according to the interframe motion, thereby adding a motion blur to the original image.

An image reproducing apparatus according to the present exemplary embodiment includes the motion blur generation unit 112 and the system control unit 101.

A still image generation unit 113 captures a predetermined image out of frame images constituting a moving image to generate a still image.

The display control unit 114 controls a display device 115 to display not only an image (camera through image) based on the video signal output from the camera signal processing unit 106 but also a setting menu image, a recorded image, etc. by outputting video signals processed according to use.

The display device 115 is a liquid crystal display (LCD) element or the like, and displays an image generated by the display control unit 114.

When the imaging apparatus 100 is capturing an image, the video signal output from the camera signal processing unit 106 is supplied to the encoder 107 so that image data is recorded on a recording medium, and at the same time, the video signal is supplied to the display control unit 114 so that a camera through image is displayed.

When the imaging apparatus 100 reproduces recorded image data, an image signal output from the motion blur generation unit 112 or the still image generation unit 113 is supplied to the display control unit 114 to display a playback image. Further, the playback image can be recorded again by supplying the reproduced video signal to the decoder 110 again.

An angular velocity sensor 116 is used to detect a shake applied to the imaging apparatus 100. A detected shake signal is supplied to the image shake correction control unit 117, and is used to control image shake correction.

Figure 2:
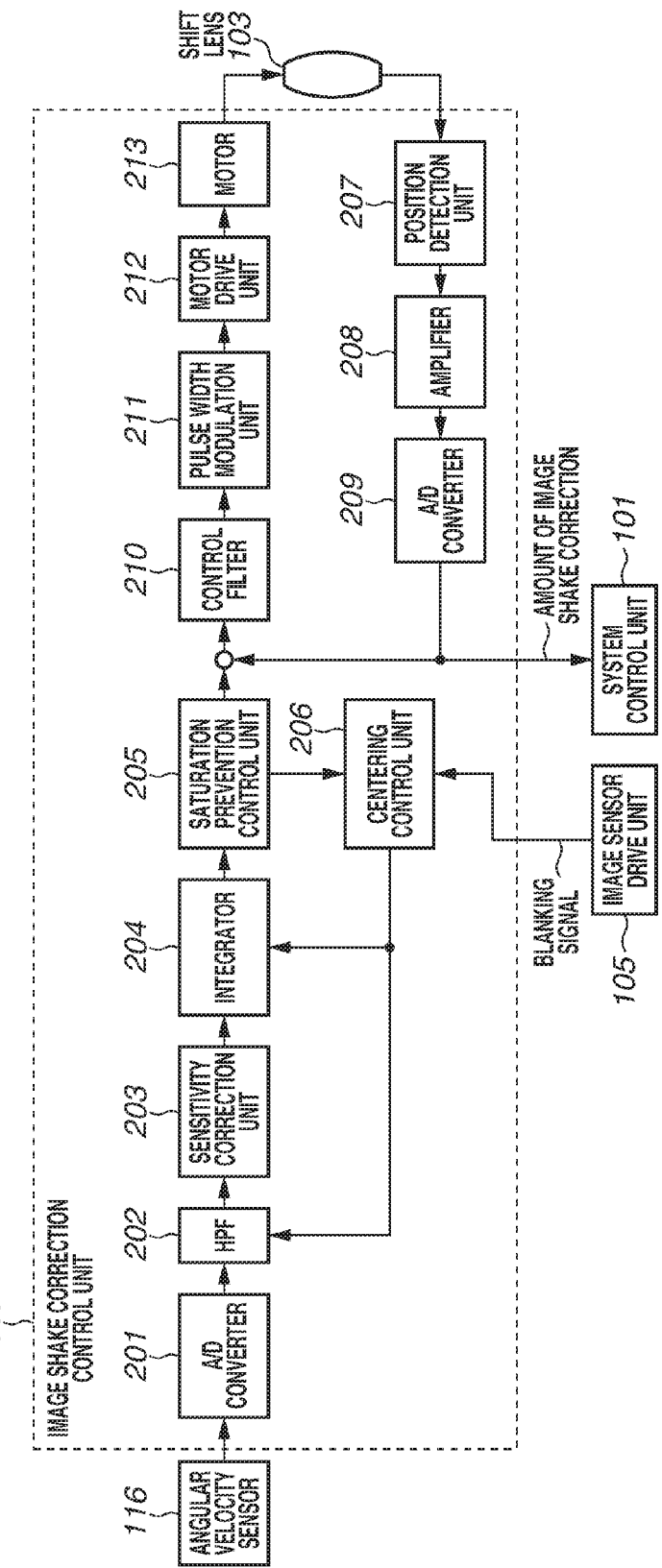
FIG. 2 is a block diagram illustrating an example of a configuration of an image shake correction control unit.

FIG. 2 is a block diagram illustrating in more detail the image shake correction control unit 117 illustrated in FIG. 1. The image shake correction control unit 117 detects a shake applied to the imaging apparatus 100 based on angular velocity information output from the angular velocity sensor 116, and drives the shift lens 103 to cancel the shake, thereby correcting an image shake arising in a captured image.

The angular velocity sensor 116 includes two different angular velocity sensors disposed in two axis directions, i.e., the horizontal rotational axis (yaw) and the vertical rotational axis (pitch) to form detection axes perpendicularly intersecting with each other on a plane perpendicularly intersecting with the optical axis.

Since signal processing for each axis and drive control on the shift lens 103 can be implemented through the same processing for both axes, descriptions will be made only for one axis.

The angular velocity sensor 116 detects the angular velocity of a shake applied to the imaging apparatus 100, and outputs a voltage corresponding to the detected angular velocity. An analog-to-digital (A/D) converter 201 converts the voltage output from the angular velocity sensor 116 into digital data to capture the digital data as angular velocity data.

A high-pass filter (HPF) 202 eliminates low-frequency components of the angular velocity data, and supplies the resultant data to the sensitivity correction unit 203.

The sensitivity correction unit 203 drives the shift lens 103 with a shift amount suitable (desirably optimal) for image shake correction. Then, the sensitivity correction unit 203 multiplies the angular velocity data by the eccentric sensitivity of the shift lens 103 (a coefficient determined by the ratio of the shift amount of the image-forming position on the image plane to the shift amount of the shift lens 103) to convert the amplitude of the angular velocity data.

An integrator 204 performs single integral on the angular velocity data output from the sensitivity correction unit 203 to convert the data into angular displacement data. In this case, the integrator 204 performs incomplete integration to prevent saturation by using a commonly known primary low-pass filter.

When receiving the calculated angular displacement data from the integrator 204, a saturation prevention control unit 205 limits the data so that the shift lens 103 does not reach an end of the mechanically movable range, and outputs the resultant data. More specifically, by using an upper limit of a control range provided inside the mechanically movable range of the shift lens 103, the saturation prevention control unit 205 limits the angular displacement data so that the angular displacement data does not exceed the control range. A centering control unit 206 determines whether a user-intended operation such as panning and tilting has been performed, and performs control to return the shift lens 103 to the center position.

More specifically, when the angular displacement data exceeds a threshold value set further inside the control range provided in the saturation prevention control unit 205, the saturation prevention control unit 205 determines that panning has been performed.

The saturation prevention control unit 205 notifies the centering control unit 206 of the determination result. When panning is determined to have been performed, the centering control unit 206 increases the cutoff frequency of the HPF 202 to limit the angular velocity data to be input to the integrator 204, and subtracts a predetermined offset from the angular velocity data input to the integrator 204.

Alternatively, the centering control unit 206 increases the cutoff frequency for the low-pass filter (LPF) calculation to be performed by the integrator 204 to control the output of the integrator 204 to return to the center. This enables controlling the angular displacement data to fall within the movable range of the shift lens 103 even when a user-intended shake such as panning and tilting is performed.

In this way, the saturation prevention control unit 205 calculates a drive target position as the final shift amount of the shift lens 103.

A position detection unit 207 detects the position of the shift lens 103, and outputs a voltage corresponding to the detected position to an amplifier 208. The amplifier 208 amplifies the voltage to a signal within a suitable voltage range. An A/D converter 209 converts the signal into digital data and supplies the digital data to a control filter 210.

The control filter 210 inputs deviation data which is the difference between the drive target position and the position data of the shift lens 103, performs various signal processing such as amplification and phase compensation on the deviation data, and outputs the resultant data to a pulse width modulation unit 211.

The pulse width modulation unit 211 modulates the output of the control filter 210 into a waveform (i.e., pulse width modulation (PWM) waveform) in which the duty ratio of the pulse wave is changed, and supplies the PWM waveform to a motor drive unit 212. A motor 213 (e.g., voice coil type motor) is driven by the motor drive unit 212 to move the shift lens 103 in a direction perpendicular to the optical axis.

A feedback loop is formed in which the position of the moved shift lens 103 is detected by the position detection unit 207 and then the next deviation data is calculated. Control is performed to minimize the difference between the drive target position and the position data.

In this way, the image shake can be corrected by driving the shift lens 103 according to the shake detected by the angular velocity sensor 116.

The image shake correction control unit 117 is supplied with the blanking signal generated by the image sensor drive unit 105. The blanking signal is used to determine whether the image sensor 104 is in the exposure period or in the blanking period. When the image sensor 104 is in the blanking period, the centering control unit 206 performs centering processing for returning the shift lens 103 to the correction center position of the control range.

The blanking signal is supplied to the centering control unit 206. When the image sensor 104 is determined to be in the blanking period, the centering control unit 206 increases the cutoff frequency of the LPF calculation to be performed by the integrator 204 to control the output of the integrator 204 to return to the center.

The output of the A/D converter 209 (the position data of the shift lens 103, i.e., the amount of image shake correction) is supplied to the system control unit 101, and is used to calculate an interframe image shake.

Figure 3:
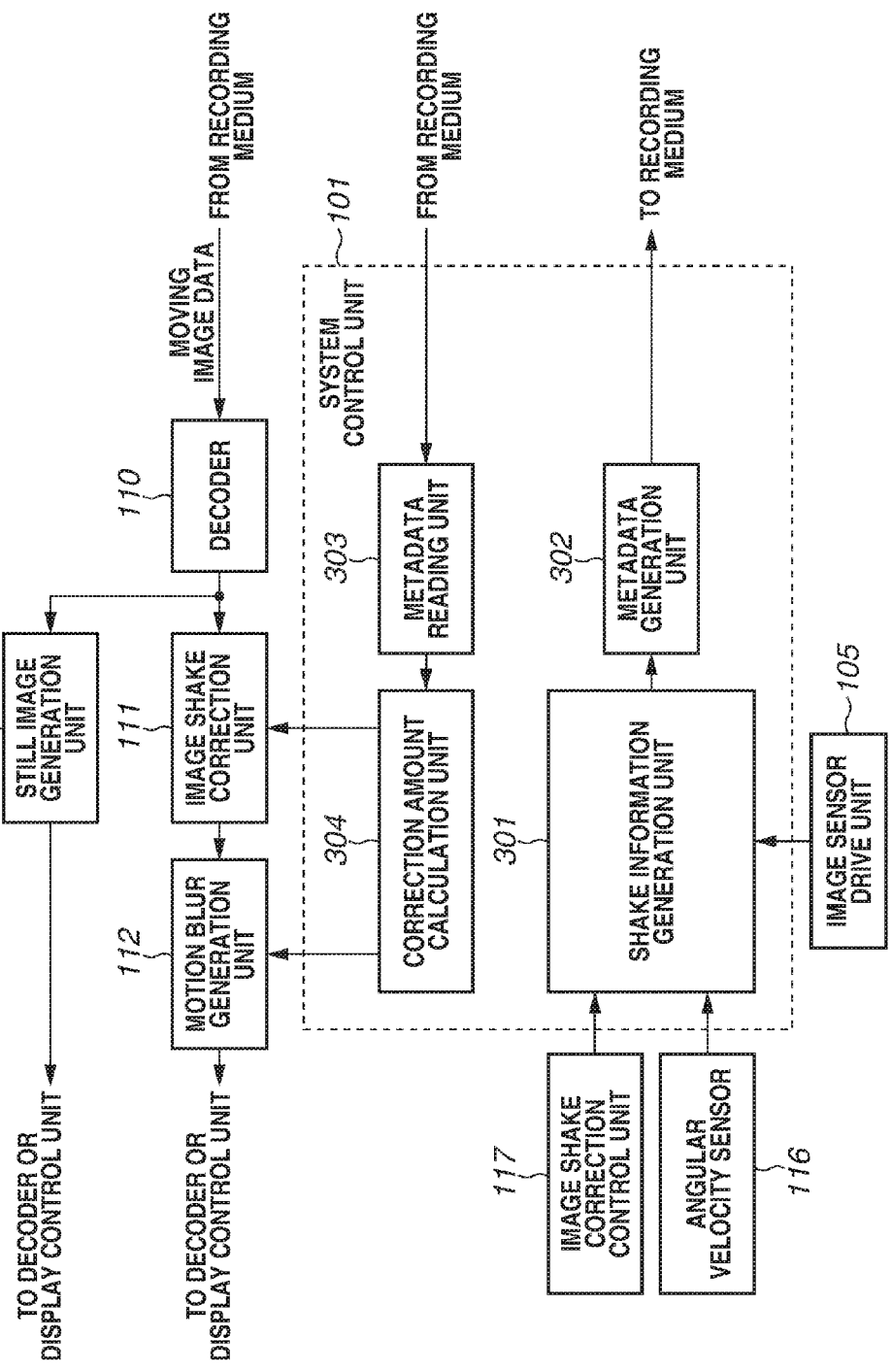
FIG. 3 is a block diagram illustrating details of a system control unit.

FIG. 3 is a block diagram illustrating in detail the control performed by the system control unit 101. A shake information generation unit 301 calculates the amount of interframe image shake of the captured moving image based on the shake data of the imaging apparatus 100 supplied from the angular velocity sensor 116 and the amount of image shake correction supplied from the image shake correction control unit 117.

The shake information generation unit 301 is supplied with the blanking signal from the image sensor drive unit 105, and, in synchronization with the moving image being captured, calculates the amount of image shake corresponding to each frame, and outputs the calculated amount of image shake to a metadata generation unit 302.

The metadata generation unit 302 generates metadata in a predetermined format based on the amount of image shake output from the shake information generation unit 301, and records the generated metadata in the recording medium 109 in association with the moving image data generated by the encoder 107.

A metadata reading unit 303 reads the metadata recorded in association with the moving image data, extracts the amount of image shake corresponding to each frame of the moving image generated by the decoder 110, and outputs the extracted amount of image shake to a correction amount calculation unit 304.

The correction amount calculation unit 304 calculates an amount of image shake correction used by the image shake correction unit 111 and an amount of a motion blur added by the motion blur generation unit 112, based on the amount of image shake supplied from the metadata reading unit 303.

FIGS. 4A, 4B, and 4C are graphs illustrating in more detail the processing performed by the system control unit 101 and the image shake correction control unit 117.

Referring to FIGS. 4A, 4B, and 4C, the vertical synchronization signal determines the drive timing in the image sensor 104, and is used to take synchronization of imaging control for each frame. Referring to FIGS. 4A, 4B, and 4C, F0 denotes the first frame, F1 denotes the second frame, and F2 denotes the third frame for descriptions.

The blanking signal is output from the image sensor drive unit 105 and indicates whether the image sensor 104 is in the exposure period or in the blanking period in each frame.

FIG. 4A illustrates shake data (angular displacement data) of a shake applied to the imaging apparatus 100, which is calculated by the shake information generation unit 301 illustrated in FIG. 3. The shake information generation unit 301 performs single integral on the angular velocity data, output from the angular velocity sensor 116, to calculate shake data (angular displacement data).

Note that the calculated shake data indicates the angular displacement itself of the shake applied to the imaging apparatus 100 but does not indicate the amount of correction used for image shake correction. In the frames F0, F1, and F2, B0, B1, and B2 indicate shake data values at timings when the blanking signal is switched from the blanking period to the exposure period, respectively.

FIG. 4B illustrates the correction amount data for image shake correction calculated by the image shake correction control unit 117, which is the drive target position of the optical shift lens 103. In the frames F0, F1, and F2, C0, C1, and C2 indicate correction amount data values at timings when the blanking signal is switched from the blanking period to the exposure period, respectively.

FIG. 4C illustrates shake data between frame images generated by the shake information generation unit 301, which is supplied to the metadata generation unit 302 as the amount of image shake. M1 indicates the shake data value between the frames F0 and F1, and M2 indicates the shake data value between the frames F1 and F2.

M0 indicates the shake data value between the frame F0 and the preceding frame (no illustrated) which is zero.

First, the correction amount data generated by the image shake correction control unit 117 will be described below. When the shake as illustrated in FIG. 4A is applied to the imaging apparatus 100, the image shake correction control unit 117 performs a different method for generating correction amount data depending on the blanking signal.

As illustrated in FIG. 4B, in the blanking period of the frame F0, centering control is performed and therefore the correction amount data value is C0 which is approximately zero. When the blanking signal is switched to the exposure period, the image shake correction control unit 117 drives the shift lens 103 to perform image shake correction based on the shake data. The correction amount data at this timing is calculated by subtracting a value (B0−C0) from the shake data in the exposure period of the frame F0.

In the blanking period of the frame F1, the image shake correction control unit 117 performs centering control for driving the shift lens 103 to return to the center position. The data value C1 indicates the correction amount data as a result of the movement of the shift lens 103 toward the center position through centering control.

When the blanking signal is switched to the exposure period, the image shake correction control unit 117 drives again the shift lens 103 to perform image shake correction based on the shake data. The correction amount data at this timing is calculated by subtracting a value (B1−C1) from the shake data in the exposure period of the frame F1.

In the blanking period of the frame F2, the image shake correction control unit 117 performs centering control for driving the shift lens 103 to return to the center position. The data value C2 indicates the correction amount data as a result of movement of the shift lens 103 toward the center position through centering control.

When the blanking signal is switched to the exposure period, the image shake correction control unit 117 drives again the shift lens 103 to perform image shake correction based on the shake data. The correction amount data at this timing is calculated by subtracting a value (B2−C2) from the shake data in the exposure period of the frame F2.

The image shake correction control unit 117 enables the above-described control for driving the shift lens 103 to perform image shake correction in the exposure period and for driving the shift lens 103 to move toward the center position in the blanking period.

When a still image is generated from image data, a favorable image in which image shake in the exposure period is corrected can be obtained by performing the above-described control.

Next, shake data between frame images generated by the shake information generation unit 301 will be described below. The shake data between frame images calculated in the present exemplary embodiment refers to the remaining shake data which cannot be corrected by the shift lens 103.

Therefore, the shake data can be calculated by subtracting the amount of correction for interframe image shake correction from the interframe shake. As illustrated in FIG. 4A, a shake data value ΔB1 produced between the frames F0 and F1 can be calculated by a formula ΔB1=B1−B0.

Similarly, a shake data value ΔB2 produced between the frames F1 and F2 can be calculated by a formula ΔB2=B2−B1.

As illustrated in FIG. 4B, an amount of correction ΔC1 for image shake correction made between the frames F0 and F1 can be calculated by a formula ΔC1=C1−C0. Similarly, an amount of correction ΔC2 for image shake correction made between the frames F1 and F2 can be calculated by a formula ΔC2=C2−C1.

As illustrated in FIG. 4C, the shake data value M1 between the frames F0 and F1 can be calculated by a formula M1=ΔB1−ΔC1, and the shake data value M2 between the frames F1 and F2 can be calculated by a formula M2=ΔB2−ΔC2.

More specifically, when reproducing moving image data as a moving image, the system control unit 101 corrects an image shake between frame images based on first shake information by using the second image shake correction unit (electronic image stabilization) that electronically corrects an image shake between frame images of moving image data.

Then, the system control 101 generates as second shake information a value obtained by subtracting the result of correction by the second image shake correction unit from the first shake information, adds a motion blur based on the second shake information to the moving image, and reproduces the resultant moving image.

In this way, the image shake correction control unit 117 performs control for driving the shift lens 103 to perform image shake correction in the exposure period and for driving the shift lens 103 to move toward the center position in the blanking period, and at the same time the system control unit 101 calculates interframe shake data.

The shake data calculated by the shake information generation unit 301 is recorded as metadata together with image data. When reproducing a moving image, the system control unit 101 controls the image shake correction unit 111 based on the shake data recorded as metadata.

When image data is reproduced as a moving image, an interframe image shake can be corrected by performing the above-described control. Accordingly, an image shake arising when image data is reproduced as a moving image can be corrected and the observer can see a favorable moving image.

As described above, when reproducing moving image data as a moving image, the system control unit 101 adds thereto a motion blur based on the first shake information arising between frame images of the moving image data, and reproduces the resultant moving image. When reproducing the moving image data as a still image, the system control unit 101 reproduces the still image without adding thereto a motion blur based on the first shake information.

Figure 5A:
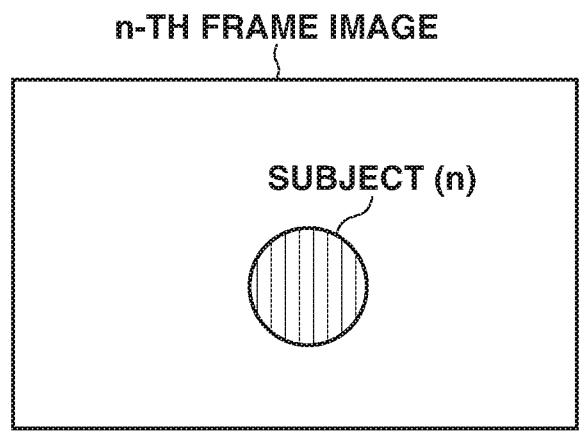
FIGS. 5A, 5B, and 5C illustrate an example of a control method for adding a motion blur to a moving image.

Processing for adding a motion blur based on an amount of movement performed by the motion blur generation unit 112 will be described below with reference to FIGS. 5A, 5B, and 5C. FIG. 5A illustrates the position of a subject (n) captured in the n-th frame, and FIG. 5B illustrates an image captured in the (n+1)-th frame (the frame next to the n-th frame illustrated in FIG. 5A).

Figure 5B:
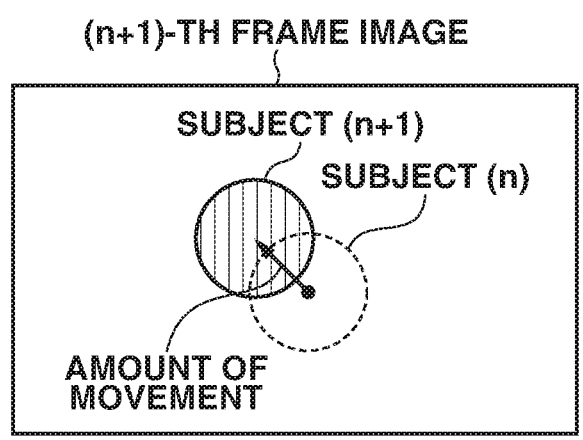

FIG. 5B illustrates that, since a shake is applied to the imaging apparatus 100, the subject has moved from the position of the subject (n) to the position of a subject (n+1). Although a shake is applied to the imaging apparatus 100, including the exposure period of a captured image, between the n-th and the (n+1)-th frames, an image shake in the exposure period has been corrected in the image by the control performed by the image shake correction control unit 117.

In this case, when one of those frame images is seen as a still image, a still image can be obtained as a favorable image in which an image shake is corrected. However, when those frame images are reproduced as a moving image, the motion of a moving object is discontinuously displayed and visual image degradation with which a ghost is perceived by the observer is thereby caused.

Therefore, when those frame images are reproduced as a moving image, the motion blur generation unit 112 adds a motion blur to the moving image to prevent the motion of a moving object from being discontinuously displayed.

Referring to FIG. 5B, the amount of movement indicating a positional change from the position of the subject (n) to the position of the subject (n+1) can be uniquely calculated from the calculated shake data as described above with reference to FIGS. 4A, 4B, and 4C, and the focal length of the imaging lens 102.

More specifically, the amount of movement can be calculated by a formula $M = f \cdot \tan \theta$, where M denotes the amount of movement, $\theta$ denotes interframe shake data (angle), and f denotes the focal length. The amount of movement is a vector having components in the vertical and the horizontal directions of the screen, and therefore is obtained by calculating horizontal and vertical components of the shake data.

Figure 5C:
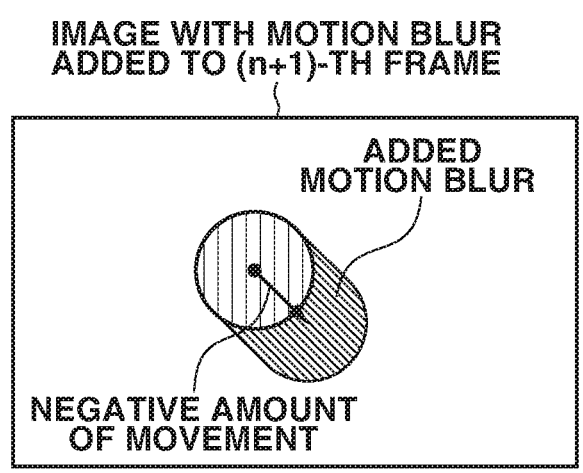

Referring to FIG. 5C, a motion blur is added based on the amount of movement calculated in this way. Referring to FIG. 5C, a vector starting from the subject (n+1) directed in the opposite direction of the amount of movement (vector quantity) is added as a motion blur to the image in the (n+1)-th frame.

Adding a motion blur in this way dissolves time discontinuity in the subject's motion when the subject moves from the position of the subject (n) to the position of the subject (n+1). Accordingly, adding a motion blur enables preventing the motion of a moving object included in a reproduced moving image from being discontinuously displayed, and thus enables preventing visual image degradation with which a ghost is perceived by the observer.

In the method for adding a motion blur described above with reference to FIGS. 5A, 5B, and 5C, a case where an interframe image shake is corrected by the image shake correction unit 111 is not taken into consideration. A method for adding a motion blur in a case where an interframe image shake is corrected by the image shake correction unit 111 will be described below with reference to FIGS. 6A, 6B, 6C, and 6D.

Similar to FIGS. 5A and 5B, FIGS. 6A and 6B illustrate a positional change of the subject when a shake is applied to the imaging apparatus 100. The positions of the subject (n) and the subject (n+1) are the same as those illustrated in FIG. 5B.

Figure 6A:
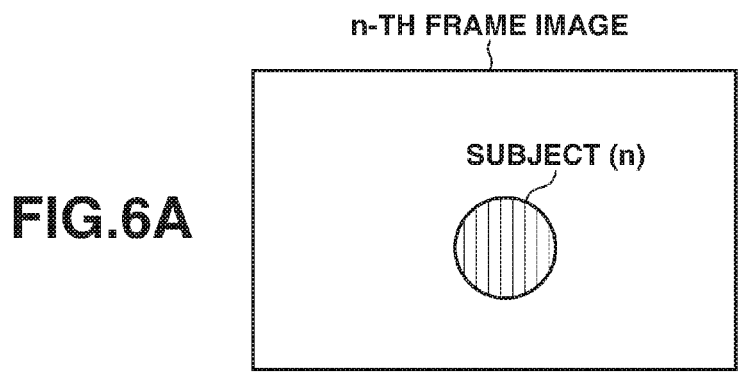
FIGS. 6A, 6B, 6C, and 6D illustrate an example of a control method for adding image shake correction and a motion blur to a moving image.
Figure 6B:
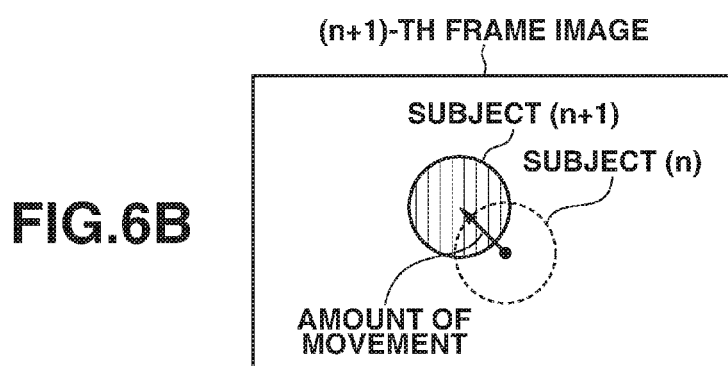
Figure 6C:
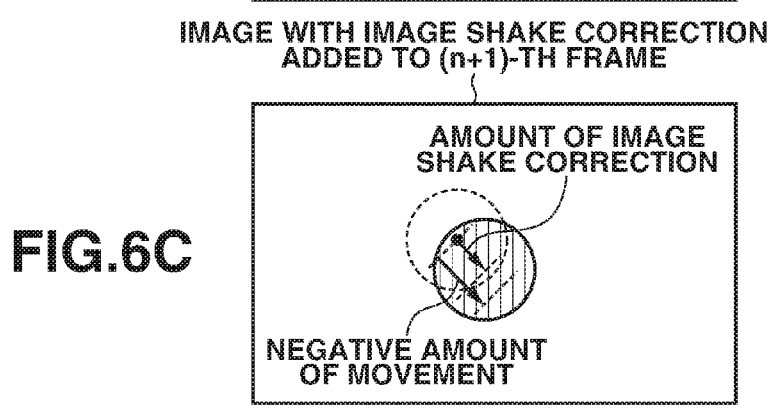

FIG. 6C illustrates an image as the result of correcting an image shake between frame images by the image shake correction unit 111 when reproducing recorded image data as a moving image.

The image shake correction unit 111 performs image shake correction based on the interframe shake data (output by the shake information generation unit 301) recorded as metadata.

However, the image shake correction range is limited. Therefore, if the shake data is used for image shake correction as it is, an end of the image shake correction range is reached, making it impossible to perform image shake correction for a further range.

Therefore, the image shake correction unit 111 performs image shake correction by using the shake data attenuated by filter processing instead of using the shake data for image shake correction as it is.

Figure 6D:
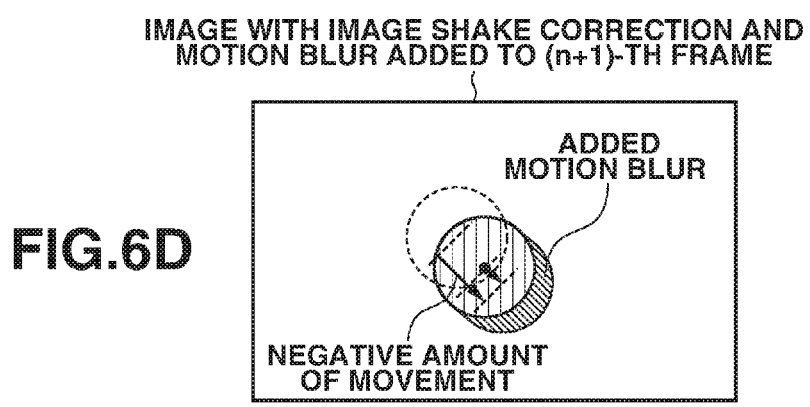

Referring to FIG. 6C, an attenuated value of the shake data is used as the amount of image shake correction while a value calculated from the shake data is used as the amount of movement. FIG. 6D illustrates an image having undergone the image shake correction and further the addition of a motion blur by the motion blur generation unit 112. In this case, a range from the position of the subject (n) in the n-th frame to the position of the subject after image shake correction is performed on the image in the (n+1)-th frame is seen as a moving image. Therefore, the image shake correction unit 111 adds a motion blur corresponding to the amount of movement.

More specifically, the motion blur generation unit 112 adds a motion blur based on a value obtained by subtracting the amount of image shake correction from the amount of movement M described above with reference to FIGS. 5A, 5B, and 5C.

Adding a motion blur in this way enables not only correcting an image shake between frame images but also dissolving time discontinuity in the subject's motion when the subject moves from the position of the subject (n) to the position of the subject (n+1).

Figure 9:
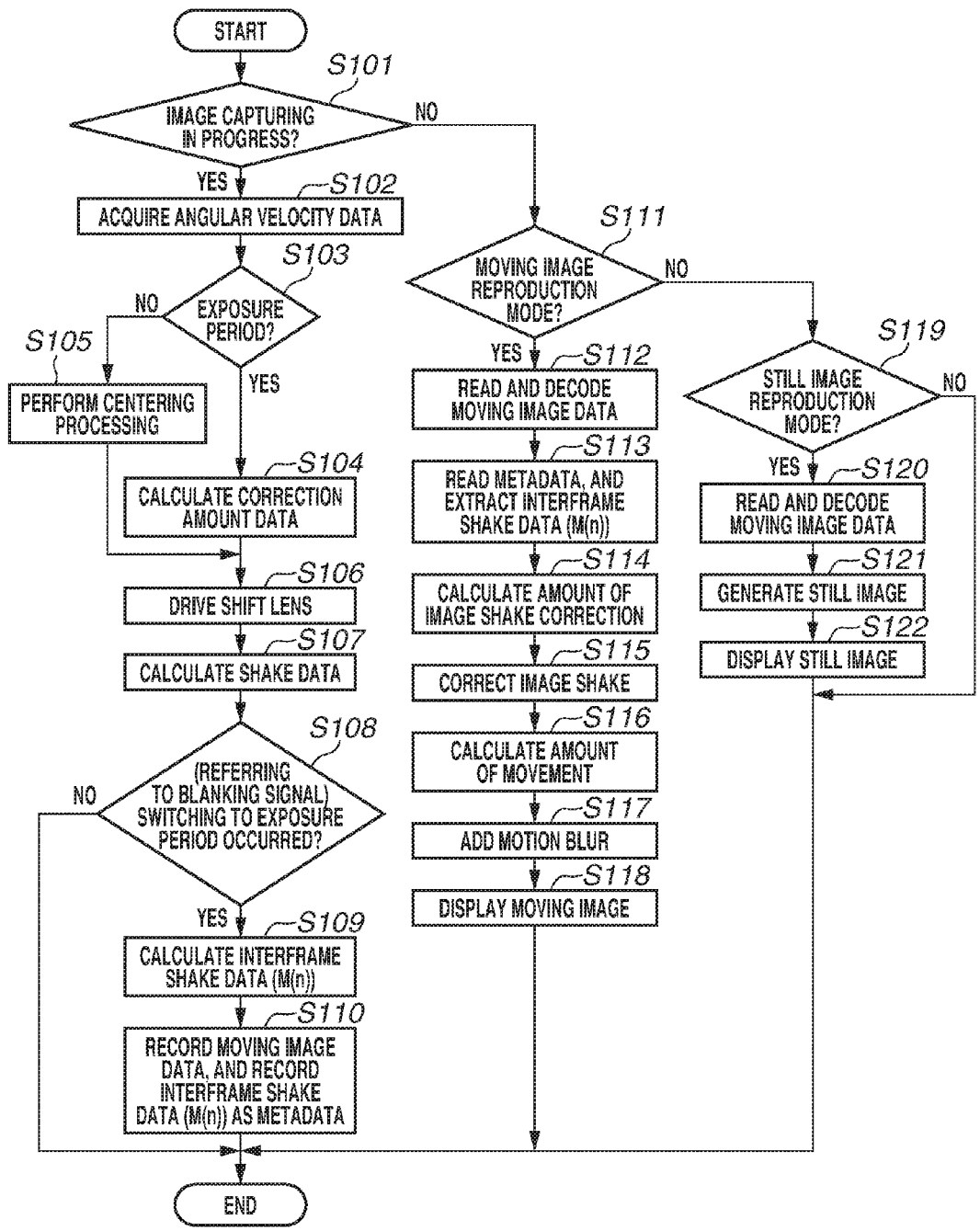
FIG. 9 is a flowchart illustrating details of control according to the first exemplary embodiment of the present disclosure.

FIG. 9 is a flowchart illustrating control according to the first exemplary embodiment of the present disclosure. Processing illustrated in FIG. 9 is repeated at predetermined intervals, for example, at 1-msec. intervals.

In step S101, the system control unit 101 determines the operating state of the imaging apparatus 100.

When the imaging apparatus 100 is capturing an image (YES in step S101), the processing proceeds to step S102. On the other hand, when the imaging apparatus 100 is not capturing an image (NO in step S101), the processing proceeds to step S111. In step S102, the system control unit 101 performs A/D conversion on the output of the angular velocity sensor 116 to acquire angular velocity data.

In step S103, the image shake correction control unit 117 refers to the blanking signal to determine whether the image sensor 104 is in the exposure period. When the image sensor 104 is determined to be in the exposure period (YES in step S103), the processing proceeds to step S104. On the other hand, when the image sensor 104 is determined to be in the blanking period (NO in step S103), the processing proceeds to step S105.

In step S104, the image shake correction control unit 117 calculates the correction amount data for image shake correction by the shift lens 103 based on the angular velocity data.

In step S105, the image shake correction control unit 117 sets the correction amount data to gradually move the shift lens 103 to the center position.

In step S106, the image shake correction control unit 117 drives the shift lens 103 based on the correction amount data calculated as described above. The above-described processing in steps S103 to S106 is control processing performed by the image shake correction control unit 117.

In step S107, the system control unit 101 calculates the shake data of a shake applied to the imaging apparatus 100 based on the angular velocity data. In step S108, the system control unit 101 refers to the blanking signal to determine whether the switching to the exposure period has occurred.

When the system control unit 101 determines that the switching to the exposure period has occurred (YES in step S108), the processing proceeds to step S109. On the other hand, when the system control unit 101 determines that the switching to the exposure period has not occurred (NO in step S108), the processing ends. The determination processing in step S108 generates a timing for performing processing on a frame basis in synchronization with the image capturing timing.

In step S109, the system control unit 101 calculates interframe shake data of the captured image. In the calculation of interframe shake data, the system control unit 101 stores the correction amount data calculated in step S104 or S105, and calculates the difference from the data of the preceding frame (ΔC(n) in FIG. 4B).

Similarly, the system control unit 101 stores the shake data calculated in step S107, and calculates the difference from the data of the preceding frame (ΔB(n) in FIG. 4A).

Then, the system control unit 101 subtracts ΔC(n) from ΔB(n) to calculate interframe shake data M(n).

In step S110, the system control unit 101 records the captured moving image data in the recording medium 109, and records the interframe shake data M(n) calculated in step S108 as metadata in association with frames of the moving image data. Then, the processing ends. The above-described processing in steps S102 to S110 is performed during image capturing by the system control unit 101.

In step S111, the system control unit 101 determines whether the imaging apparatus 100 is operating in the moving image reproduction mode. When the imaging apparatus 100 is operating in the moving image reproduction mode (YES in step S111), the processing proceeds to step S112. On the other hand, when the imaging apparatus 100 is not operating in the mode (NO in step S111), the processing proceeds to step S119.

In step S112, the system control unit 101 reads the moving image data from the recording medium 109 and then generates frame images via the decoder 110. In step S113, the system control unit 101 reads the metadata from the recording medium 109 and then extracts the interframe shake data recorded in association with frames of the moving image.

In step S114, the system control unit 101 performs processing such as attenuation and integration on the interframe shake data to calculate the amount of image shake correction for correcting an interframe image shake through the image shake correction unit 111. In step S115, the system control unit 101 sets the calculated amount of image shake correction to the image shake correction unit 111, and corrects an interframe image shake.

In step S116, the system control unit 101 subtracts the amount of image shake correction from the interframe shake data to calculate the amount of interframe movement remaining in the output image of the image shake correction unit 111. In step S117, the system control unit 101 sets the amount of movement calculated in step S116 to the motion blur generation unit 112, and adds a motion blur to the moving image.

In step S118, the system control unit 101 supplies the moving image output from the motion blur generation unit 112 to the display control unit 114 to display it on the display device 115. The above-described processing in steps S112 to S118 is performed to reproduce moving image data as a moving image.

In step S119, the system control unit 101 determines whether the imaging apparatus 100 is operating in the still image reproduction mode. When the imaging apparatus 100 is operating in the still image reproduction mode (YES in step S119), the processing proceeds to step S120. On the other hand, when the imaging apparatus 100 is not operating in the mode (NO in step S119), the processing exits the flowchart. In step S120, the system control unit 101 reads moving image data from the recording medium 109 and then generates frame images via the decoder 110.

In step S121, the still image generation unit 113 generates as a still image a predetermined frame image out of the frame images output from the decoder 110.

In step S122, the system control unit 101 supplies the generated still image to the display control unit 114 to display it on the display device 115. The above-described processing in steps S120 to S122 is performed when generating and reproducing a still image from moving image data.

As described above, during moving image capturing, the imaging apparatus according to the present disclosure corrects an image shake in the exposure period and records interframe shake information as metadata.

When generating moving image data as a moving image, the imaging apparatus adds a motion blur according to the shake information recorded as metadata and then generates a moving image. When generating moving image data as a still image, the imaging apparatus generates a still image without adding a motion blur.

This enables providing an imaging apparatus capable of generating a favorable image without an image shake when generating a still image from the moving image, and capable of generating an image without strangeness even when moving image data is reproduced as a moving image.

While the present disclosure has specifically been described based on preferred exemplary embodiments, the present disclosure is not limited thereto but can be modified in diverse ways without departing from the spirit and scope thereof.

Figure 7:
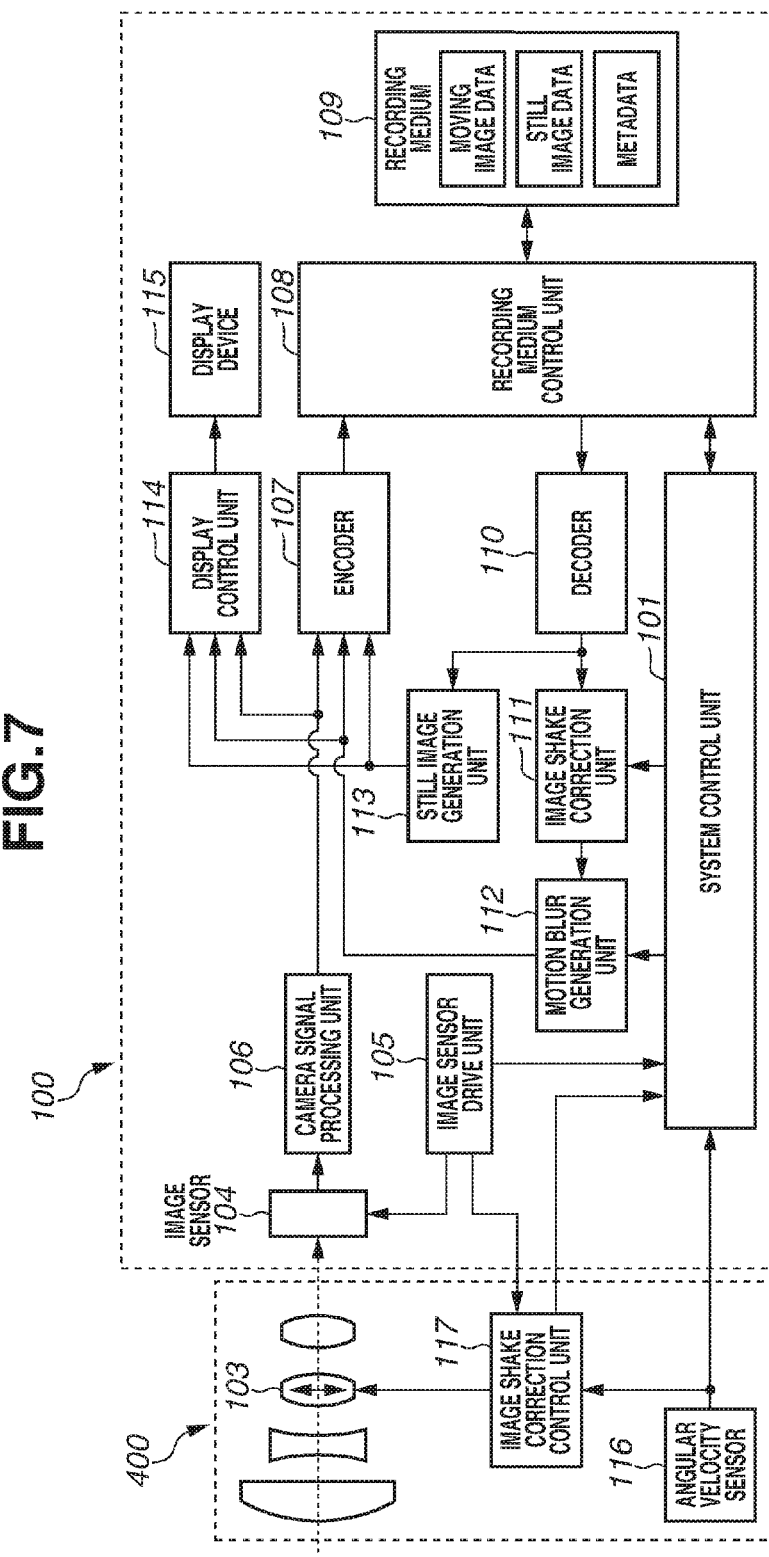
FIG. 7 is a block diagram illustrating an example of a configuration of an imaging apparatus according to a second exemplary embodiment of the present disclosure.

FIG. 7 is a block diagram illustrating a configuration of a lens interchangeable type digital camera as an example of an imaging apparatus according to a second exemplary embodiment of the present disclosure. Referring to FIG. 7, elements identical to those illustrated in FIG. 1 are assigned the same reference numeral, and redundant descriptions thereof will be omitted.

The configuration of the imaging apparatus 100 illustrated in FIG. 7 differs from the configuration of the imaging apparatus 100 illustrated in FIG. 1 in that the imaging lens 102, the shift lens 103, the angular velocity sensor 116, and the image shake correction control unit 117 have been removed. The imaging apparatus 100 illustrated in FIG. 7 is configured to be connectable with an interchangeable type lens 400 as a separate unit. The interchangeable type lens 400 is provided with a conventional general imaging lens having such functions as the zoom, focus, and iris diaphragm functions.

A part of the imaging lens includes the shift lens 103 for optically correcting a blur of the captured image, and the angular velocity sensor 116 for controlling the shift lens 103 and the image shake correction control unit 117. In this way, the interchangeable type lens 400 includes a configuration used to optically correct an image shake.

The imaging apparatus 100 and the interchangeable type lens 400 are electrically connectable with each other and are able to transmit and receive data to/from each other, for example, via a serial interface.

The angular velocity sensor 116 detects a shake applied to the interchangeable lens 400 and the imaging apparatus 100, and supplies angular velocity information to the image shake correction control unit 117. The information is also supplied to the system control unit 101 of the imaging apparatus 100 via a serial interface (not illustrated).

The image shake correction control unit 117 drives the shift lens 103 to correct an image shake arising in the captured image based on the angular velocity information detected by the angular velocity sensor 116.

The image shake correction control unit 117 is supplied with the blanking signal as an electric signal from the image sensor drive unit 105 included in the imaging apparatus 100. The image shake correction control performed by the image shake correction control unit 117 is similar to the configuration according to the first exemplary embodiment described above with reference to FIG. 2, and detailed descriptions thereof will be omitted.

The system control unit 101 of the imaging apparatus 100 is supplied with correction amount data from the image shake correction control unit 117 via a serial interface (not illustrated). This correction amount data is similar to the correction amount data according to the first exemplary embodiment described above with reference to FIGS. 4A, 4B, and 4C.

The system control unit 101 according to the present exemplary embodiment has a similar configuration according to the first exemplary embodiment described above with reference to FIG. 3. The system control unit 101 according to the present exemplary embodiment differs from that according to the first exemplary embodiment in that the angular velocity data output from the angular velocity sensor 116 and the correction amount data output from the image shake correction control unit 117 are supplied from the interchangeable type lens 400. With the above-described configuration, details of the control performed by the system control unit 101 can be implemented through the same control as the control according to the first exemplary embodiment described above with reference to FIGS. 4A, 4B, and 4C.

As described above, according to the second exemplary embodiment of the present disclosure, the imaging lens is separated from the camera body as an interchangeable type lens, and optical image shake correction is performed by the interchangeable type lens 400. Further, notifying the camera body of the angular velocity data and the correction amount data for image shake correction performed inside the interchangeable type lens 400 enables adding interframe image shake correction and a motion blur.

Also in the configuration combining the camera body and the interchangeable type lens 400 in this way, a favorable image can be generated without an image shake when generating a still image from a moving image. Accordingly, it is possible to provide an imaging apparatus capable of generating an image without strangeness even when moving image data is reproduced as a moving image.

Figure 8:
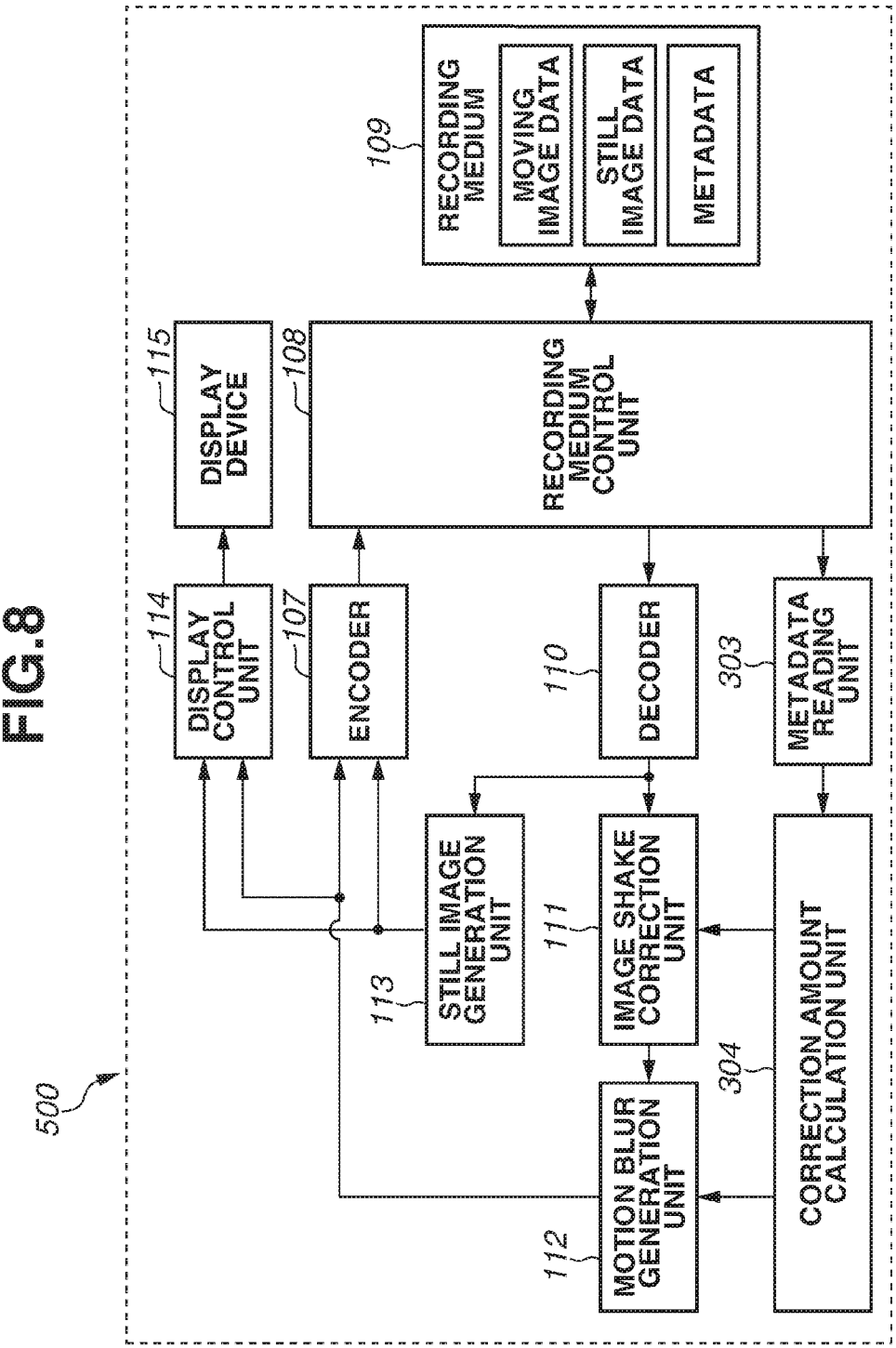
FIG. 8 is a block diagram illustrating an example of a configuration of an imaging apparatus according to a third exemplary embodiment of the present disclosure.

FIG. 8 is a block diagram illustrating a configuration of an image reproducing apparatus not including an imaging lens and an imaging unit, as an example of an apparatus according to a third exemplary embodiment of the present disclosure. Referring to FIG. 8, elements identical to those illustrated in FIG. 1 are assigned the same reference numeral, and redundant descriptions thereof will be omitted.

The configuration of an image reproducing apparatus 500 illustrated in FIG. 8 differs from the configuration of the imaging apparatus 100 illustrated in FIG. 1 in that the system control unit 101, the imaging lens 102, the shift lens 103, the image sensor 104, the image sensor drive unit 105, the camera signal processing unit 106, the angular velocity sensor 116, and the image shake correction control unit 117 have been removed.

Although the image reproducing apparatus 500 does not include an imaging unit and is dedicated for reproducing image data, it is capable of performing image shake correction based on moving image data recorded in the storage medium 109 and information recorded as metadata accompanying the moving image data, when reproducing a moving image.

Moving image data and metadata recorded in the storage medium 109 include moving image data captured by the imaging apparatus 100 according to the first or the second exemplary embodiment and the amount of image shake associated with the moving image data. The recording medium control unit 108 reads moving image data or still image data from the recording medium 109 and then supplies it to the decoder 110.

The recording medium control unit 108 also reads metadata from the recording medium 109 and then supplies it to the metadata reading unit 303. The decoder 110 decodes moving image data and still image data in various format recorded in the recording medium 109 to generate an image signal.

The image shake correction unit 111 corrects an image shake included in a moving image. More specifically, the image shake correction unit 111 clips a predetermined range from the original image, and controls the clipping position of the image on a frame basis to correct an interframe image shake.

The motion blur generation unit 112 generates images having different resolutions from the original image and combines them with the original image with the image position shifted according to the interframe motion, thus adding a motion blur to the image.

The still image generation unit 113 captures a predetermined image out of frame images constituting the moving image to generate a still image.

The display control unit 114 outputs the image data generated by the motion blur generation unit 112 or an image signal processed according to uses, such as a setting menu image, generated by the still image generation unit 113 to display an image on the display device 115. The display device 115 is a liquid crystal display (LCD) unit for displaying the image generated by the display control unit 114. Supplying the reproduced image signal to the decoder 110 enables recording the playback image again.

The correction amount calculation unit 304 calculates the amount of interframe image shake correction to be made by the image shake correction unit 111 and the amount of motion blur to be added by the motion blur generation unit 112, based on the image shake data recorded in association with the moving image data. The amount of image shake correction and the amount of motion blur calculated by the correction amount calculation unit 304 are similar to those in control according to the first exemplary embodiment, and detailed descriptions thereof will be omitted.

As described above, the third exemplary embodiment of the present disclosure is configured to correct an image shake of moving image data and add a motion blur, based on the interframe shake data of the metadata associated with the moving image data in advance.

This configuration enables correcting an interframe image shake of a moving image and adding a motion blur even with an image reproducing apparatus not including an imaging unit. Thus, it becomes possible to provide an imaging apparatus capable of generating a favorable image without an image shake when generating a still image from a moving image, and capable of generating an image without strangeness even when moving image data is reproduced as a moving image.

The object of the present disclosure can be implemented by the following. More specifically, a storage medium recording a program code (software) describing procedures for implementing the functions of the above-described exemplary embodiments is supplied to a system or apparatus. A computer (or CPU or micro processing unit (MPU)) of the system or apparatus reads and executes the program code stored in the storage medium.

In this case, the program code itself read from the storage medium achieves new functions of the present disclosure, and the program and the storage medium storing the program code are included in the present disclosure.

Storage media for supplying the program code include, for example, a flexible disk, a hard disk, an optical disc, and a magneto-optical disk. Storage media further include a compact disc read only memory (CD-ROM), a compact disc recordable (CD-R), a compact disk rewritable (CD-RW), a digital versatile disc read only memory (DVD-ROM), a digital versatile disc random access memory (DVD-RAM), a digital versatile disc rewritable (DVD-RW), a digital versatile disc recordable (DVD-R), a magnetic tape, a non-volatile memory card, and a ROM.

The functions of the above-described exemplary embodiments are implemented by enabling execution of the program code read by the computer. The present disclosure also includes a case where an operating system (OS) operating on the computer performs a part or whole of actual processing based on instructions included in the program code, and the functions of the above-described exemplary embodiments are implemented through the processing.

The present disclosure further includes a case where the program code read from the storage medium is stored in a memory included in a function expansion board inserted into the computer or in a function expansion unit connected to the computer, and then a CPU, which may include one or more processors, included in the function expansion board or the function expansion unit performs a part or whole of actual processing based on instructions included in the program code.

Further, the present disclosure is applicable not only to apparatuses intended mainly for image capturing, such as digital cameras, but also to arbitrary apparatuses having a built-in or externally connected imaging apparatus, such as mobile phones, personal computers (laptop type, desktop type, and tablet type), and game machines. Therefore, the "imaging apparatus" according to the present specification is intended to include an arbitrary electronic apparatus having an image capturing function.

According to the present disclosure, it is possible to provide an imaging apparatus capable of generating a favorable image without an image shake when generating a still image from a moving image, and capable of generating an image without strangeness even when moving image data is reproduced as a moving image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-046425, filed Mar. 9, 2015, which is hereby incorporated by reference herein in its entirety.

What is claimed is:

1. An image reproducing apparatus comprising:
at least one processor or circuitry that performs:
reproducing, as a moving image, moving image data which is a moving image in which an image shake is corrected based on an output, and reproducing a predetermined frame image of the moving image data as a still image; and
adding a motion blur produced by an interframe motion to the frame image,
wherein, when reproducing the moving image data as the moving image, the reproducing reproduces the moving image with a motion blur based on first shake information arising between frame images of the moving image data added,
wherein, when reproducing the moving image data as the still image, the reproducing reproduces the still image without a motion blur based on the first shake information added,
wherein, based on the output, correction is made to an image shake arising in an exposure period of each frame image of the moving image data, and
wherein, based on the output and a result of the correction, the reproducing calculates an amount of image movement between frame images of the moving image data to generate the first shake information.

2. An imaging apparatus comprising:
the image reproducing apparatus according to claim 1,
wherein the at least one processor or circuitry further performs:
recording, as moving image data, a moving image in which an image shake is corrected based on the output; and
generating the first shake information arising between frame images of the moving image data.

3. An image reproducing method comprising:
recording, as moving image data, a moving image in which an image shake is corrected based on an output;
generating first shake information between frame images of the moving image data;
reproducing the moving image data as a moving image, and reproducing a predetermined frame image of the moving image data as a still image; and
adding a motion blur produced by an interframe motion to the frame image,
wherein, when reproducing the moving image data as the moving image, the reproducing reproduces the moving image with a motion blur based on the first shake information added,
wherein, when reproducing the moving image data as the still image, the reproducing reproduces the still image without a motion blur based on the first shake information added,
wherein, based on the output, correction is made to an image shake arising in an exposure period of each frame image of the moving image data, and
wherein, based on the output and a result of the correction, the reproducing calculates an amount of image movement between frame images of the moving image data to generate the first shake information.

4. A non-transitory computer-readable storage medium storing a program for causing a computer to execute each process of an image reproducing method comprising:
recording, as moving image data, a moving image in which an image shake is corrected based on an output;
generating first shake information between frame images of the moving image data;

reproducing the moving image data as a moving image, and reproducing a predetermined frame image of the moving image data as a still image; and adding a motion blur produced by an interframe motion to the frame image, wherein, when reproducing the moving image data as the moving image, the reproducing reproduces the moving image with a motion blur based on the first shake information added, wherein, when reproducing the moving image data as the still image, the reproducing reproduces the still image without a motion blur based on the first shake information added, wherein, based on the output, correction is made to an image shake arising in an exposure period of each frame image of the moving image data, and wherein, based on the output and a result of the correction, the reproducing calculates an amount of image movement between frame images of the moving image data to generate the first shake information.

5. An image reproducing apparatus comprising:

at least one processor or circuitry that performs:

reproducing, as a moving image, moving image data which is a moving image in which an image shake is corrected based on an output, and reproducing a predetermined frame image of the moving image data as a still image; and adding a motion blur produced by an interframe motion to the frame image, wherein, when reproducing the moving image data as the moving image, the reproducing reproduces the moving image with a motion blur based on first shake information arising between frame images of the moving image data added, wherein, when reproducing the moving image data as the still image, the reproducing reproduces the still image without a motion blur based on the first shake information added, wherein, in an exposure period, correction is made to an image shake arising in the exposure period based on the output, and wherein, in a blanking period, an image shake correction element is controlled to move toward a correction center position.

6. An imaging apparatus comprising:

the image reproducing apparatus according to claim 5, wherein the at least one processor or circuitry further performs:

recording, as moving image data, a moving image in which an image shake is corrected based on the output; and generating the first shake information arising between frame images of the moving image data.

7. An image reproducing method comprising:

recording, as moving image data, a moving image in which an image shake is corrected based on an output;

generating first shake information between frame images of the moving image data;

reproducing the moving image data as a moving image, and reproducing a predetermined frame image of the moving image data as a still image; and adding a motion blur produced by an interframe motion to the frame image, wherein, when reproducing the moving image data as the moving image, the reproducing reproduces the moving image with a motion blur based on the first shake information added, wherein, when reproducing the moving image data as the still image, the reproducing reproduces the still image without a motion blur based on the first shake information added, wherein, in an exposure period, correction is made to an image shake arising in the exposure period based on the output, and wherein, in a blanking period, an image shake correction element is controlled to move toward a correction center position.

8. A non-transitory computer-readable storage medium storing a program for causing a computer to execute each process of an image reproducing method comprising:

recording, as moving image data, a moving image in which an image shake is corrected based on an output;

generating first shake information between frame images of the moving image data;

reproducing the moving image data as a moving image, and reproducing a predetermined frame image of the moving image data as a still image; and adding a motion blur produced by an interframe motion to the frame image, wherein, when reproducing the moving image data as the moving image, the reproducing reproduces the moving image with a motion blur based on the first shake information added, wherein, when reproducing the moving image data as the still image, the reproducing reproduces the still image without a motion blur based on the first shake information added, wherein, in an exposure period, correction is made to an image shake arising in the exposure period based on the output, and wherein, in a blanking period, an image shake correction element is controlled to move toward a correction center position.

9. An image reproducing apparatus comprising:

at least one processor or circuitry that performs:

reproducing, as a moving image, moving image data which is a moving image in which an image shake is corrected based on an output, and reproducing a predetermined frame image of the moving image data as a still image; and adding a motion blur produced by an interframe motion to the frame image, wherein, when reproducing the moving image data as the moving image, the reproducing reproduces the moving image with a motion blur based on first shake information arising between frame images of the moving image data added, wherein, when reproducing the moving image data as the still image, the reproducing reproduces the still image without a motion blur based on the first shake information added, and wherein, when reproducing the moving image data as the moving image, the reproducing corrects an image shake between frame images based on the first shake information by electronically correcting an image shake between frame images of the moving image data, generates as second shake information a value obtained by subtracting a result of correction from the first shake information, and reproduces the moving image with a motion blur based on the second shake information added.

10. An imaging apparatus comprising:

the image reproducing apparatus according to claim 9, wherein the at least one processor or circuit further performs:

recording, as moving image data, a moving image in which an image shake is corrected based on the output; and generating the first shake information arising between frame images of the moving image data.

11. An image reproducing method comprising:

recording, as moving image data, a moving image in which an image shake is corrected based on an output;

generating first shake information between frame images of the moving image data;

reproducing the moving image data as a moving image, and reproducing a predetermined frame image of the moving image data as a still image; and adding a motion blur produced by an interframe motion to the frame image, wherein, when reproducing the moving image data as the moving image, the reproducing reproduces the moving image with a motion blur based on the first shake information added, wherein, when reproducing the moving image data as the still image, the reproducing reproduces the still image without a motion blur based on the first shake information added, and wherein, when reproducing the moving image data as the moving image, the reproducing corrects an image shake between frame images is corrected based on the first shake information by electronically correcting an image shake between frame images of the moving image data, generates as second shake information a value obtained by subtracting a result of correction from the first shake information, and reproduces the moving image with a motion blur based on the second shake information added.

12. A non-transitory computer-readable storage medium storing a program for causing a computer to execute each process of an image reproducing method comprising:

recording, as moving image data, a moving image in which an image shake is corrected based on an output;

generating first shake information between frame images of the moving image data;

reproducing the moving image data as a moving image, and reproducing a predetermined frame image of the moving image data as a still image; and adding a motion blur produced by an interframe motion to the frame image, wherein, when reproducing the moving image data as the moving image, the reproducing reproduces the moving image with a motion blur based on the first shake information added, wherein, when reproducing the moving image data as the still image, the reproducing reproduces the still image without a motion blur based on the first shake information added, and wherein, when reproducing the moving image data as the moving image, the reproducing corrects an image shake between frame images is corrected based on the first shake information by electronically correcting an image shake between frame images of the moving image data, generates as second shake information a value obtained by subtracting a result of correction from the first shake information, and reproduces the moving image with a motion blur based on the second shake information added.

13. An image reproducing apparatus comprising:

at least one processor or circuitry that performs:

reproducing, as a moving image, moving image data which is a moving image in which an image shake is corrected based on an output, and reproducing a predetermined frame image of the moving image data; and adding a motion blur produced by an interframe motion to the frame image, wherein, when reproducing the moving image data as the moving image, the reproducing reproduces the moving image with a motion blur based on first shake information arising between frame images of the moving image data added, wherein, when reproducing the moving image data as the predetermined frame image, the reproducing reproduces the predetermined frame image without a motion blur based on the first shake information added, wherein, based on the output, correction is made to an image shake arising in an exposure period of each frame image of the moving image data, and wherein, based on the output and a result of the correction, the reproducing calculates an amount of image movement between frame images of the moving image data to generate the first shake information.

14. An image reproducing method comprising:

reproducing, as a moving image, moving image data which is a moving image in which an image shake is corrected based on an output, and reproducing a predetermined frame image of the moving image data; and adding a motion blur produced by an interframe motion to the frame image, wherein, when reproducing the moving image data as the moving image, the reproducing reproduces the moving image with a motion blur based on first shake information arising between frame images of the moving image data added, wherein, when reproducing the moving image data as the predetermined frame image, the reproducing reproduces the predetermined frame image without a motion blur based on the first shake information added, wherein, based on the output, correction is made to an image shake arising in an exposure period of each frame image of the moving image data, and wherein, based on the output and a result of the correction, the reproducing calculates an amount of image movement between frame images of the moving image data to generate the first shake information.

15. An image reproducing apparatus comprising:

at least one processor or circuitry that performs:

reproducing, as a moving image, moving image data which is a moving image in which an image shake is corrected based on an output, and reproducing a predetermined frame image of the moving image data; and adding a motion blur produced by an interframe motion to the frame image, wherein, when reproducing the moving image data as the moving image, the reproducing reproduces the moving image with a motion blur based on first shake information arising between frame images of the moving image data added, wherein, when reproducing the moving image data as the predetermined frame image, the reproducing reproduces the predetermined frame image without a motion blur based on the first shake information added, wherein, in an exposure period, correction is made to an image shake arising in the exposure period based on the output, and wherein, in a blanking period, an image shake correction element is controlled to move toward a correction center position.

16. An image reproducing method comprising:
reproducing, as a moving image, moving image data which is a moving image in which an image shake is corrected based on an output, and reproducing a predetermined frame image of the moving image data; and
adding a motion blur produced by an interframe motion to the frame image,
wherein, when reproducing the moving image data as the moving image, the reproducing reproduces the moving image with a motion blur based on first shake information arising between frame images of the moving image data added,
wherein, when reproducing the moving image data as the predetermined frame image, the reproducing reproduces the predetermined frame image without a motion blur based on the first shake information added,
wherein, in an exposure period, correction is made to an image shake arising in the exposure period based on the output, and
wherein, in a blanking period, an image shake correction element is controlled to move toward a correction center position.

* * * * *